United States Patent
Oh et al.

(10) Patent No.: US 12,128,732 B2
(45) Date of Patent: Oct. 29, 2024

(54) REFRIGERANT-HEATING DEVICE AND HEAT PUMP SYSTEM INCLUDING THE SAME

(71) Applicants: HYUNDAI MOTOR COMPANY, Seoul (KR); KIA CORPORATION, Seoul (KR)

(72) Inventors: Man Ju Oh, Yongin-si (KR); Ki Mok Kim, Busan (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 210 days.

(21) Appl. No.: 17/893,340

(22) Filed: Aug. 23, 2022

(65) Prior Publication Data

US 2023/0202257 A1    Jun. 29, 2023

(30) Foreign Application Priority Data

Dec. 29, 2021   (KR) .......................... 10-2021-0191205

(51) Int. Cl.
*B60H 1/03*        (2006.01)
*B60H 1/00*        (2006.01)

(52) U.S. Cl.
CPC ..... *B60H 1/00328* (2013.01); *B60H 1/00278* (2013.01); *B60H 1/03* (2013.01)

(58) Field of Classification Search
CPC ............ B60H 1/00328; B60H 1/00335; B60H 1/2215; B60H 1/2221; B60H 2001/3288
See application file for complete search history.

(56) References Cited

U.S. PATENT DOCUMENTS

| | | | |
|---|---|---|---|
| 5,289,698 | A | 3/1994 | Garimella |
| 9,551,516 | B2 | 1/2017 | Becker et al. |
| 10,369,867 | B2 | 8/2019 | Nagasaka et al. |
| 2005/0120729 | A1 | 6/2005 | Zhang et al. |
| 2015/0059382 | A1 | 3/2015 | Noda et al. |
| 2015/0314669 | A1 | 11/2015 | Noda |
| 2021/0323378 | A1 | 10/2021 | Kajiya et al. |

FOREIGN PATENT DOCUMENTS

| | | |
|---|---|---|
| CN | 108950594 A | 12/2018 |
| JP | 2004 239506 A | 8/2004 |
| JP | 2010-106807 A | 5/2010 |
| JP | 2014-125156 A | 7/2014 |
| KR | 100297681 B1 * | 6/2002 |
| KR | 2012-0060304 A | 6/2012 |
| KR | 10-2191560 B1 | 12/2020 |
| KR | 2021-0047733 A | 4/2021 |

* cited by examiner

*Primary Examiner* — Ana M Vazquez
(74) *Attorney, Agent, or Firm* — MCDONNELL BOEHNEN HULBERT & BERGHOFF LLP

(57) ABSTRACT

A refrigerant-heating device and a heat pump system including the same are described. The refrigerant-heating device includes a heating tank including an inlet, through which a refrigerant discharged from a compressor flows thereinto, and a heat exchange outlet, from which the refrigerant therein is discharged, the heat exchange outlet being located at a position spaced apart from the inlet, and a heater coupled to the heating tank in a state of being inserted into the heating tank, the heater extending in a planar direction between the inlet and the heat exchange outlet and heating the refrigerant in the heating tank during operation.

9 Claims, 5 Drawing Sheets

REFRIGERANT-HEATING DEVICE AND HEAT PUMP SYSTEM INCLUDING THE SAME

CROSS REFERENCE TO RELATED APPLICATIONS

This application claims priority from Korean Patent Application No. 10-2021-0191205, filed on Dec. 29, 2021, in the Korean Intellectual Property Office, the disclosure of which is incorporated herein by reference in its entirety.

BACKGROUND

1. Field

The present disclosure relates to a refrigerant-heating device and a heat pump system including the same, and more particularly to a refrigerant-heating device configured to heat a refrigerant before the refrigerant flows into an indoor condenser, and a heat pump system including the same.

2. Description of the Related Art

Recently, the number of eco-friendly vehicles such as electric vehicles has increased due to environmental concerns regarding vehicles having internal combustion engines. However, in the case of vehicles having internal combustion engines of the related art, since the interior of such a vehicle can be heated using waste heat of an engine, separate energy for heating is not required. In the case of electric vehicles, since an engine is not provided therein, there is no heat source. As a result, heating is performed using additional energy, which leads to a problem of deteriorated fuel efficiency. Further, the above-mentioned problem causes an inconvenience in that the mileage of electric vehicles is reduced and recharging is required more frequently.

Meanwhile, in electric vehicles, it is additionally required to perform thermal management of electrical components such as a high-voltage battery and a motor, as well as the interior of the vehicle. That is, in the case of electric vehicles, since an indoor space, a battery, and an electrical component have different requirements for air conditioning, there is need for a technique capable of satisfying the individual requirements while saving as much energy as possible. Accordingly, provided is the concept of integrated thermal management for a vehicle in which thermal management is performed independently for each component and overall vehicle heat management operations are integrated, thereby improving thermal efficiency.

In order to perform the integrated thermal management for the vehicle, it is required to integrate and modularize complicated coolant lines and components. Accordingly, multiple components are required to be modularized and compact modularization is required in order to realize simple manufacturing and a simple package.

According to the related art, the vehicle includes a coolant circuit configured to cool the battery and each of the electrical components, and a refrigerant circuit configured to perform indoor air conditioning. Further, when the vehicle is started at a low outside temperature, a coolant heater for increasing the battery temperature and a PTC heater for indoor heating are required.

The information disclosed in this Background of the Disclosure section is only for enhancement of understanding of the general background of the disclosure, and should not be taken as an acknowledgement or any form of suggestion that this information forms the related art already known to a person skilled in the art.

SUMMARY

Therefore, the present disclosure has been made in view of the above problems, and it is an object of the present disclosure to provide a refrigerant-heating device integrated with an indoor condenser to heat a refrigerant before the refrigerant flows into the indoor condenser, and a heat pump system including the same.

In accordance with an aspect of the present disclosure, the above and other objects can be accomplished by the provision of a refrigerant-heating device including a heating tank including an inlet, through which a refrigerant discharged from a compressor flows thereinto, and a heat exchange outlet, from which the refrigerant therein is discharged, the heat exchange outlet being located at a position spaced apart from the inlet, and a heater coupled to the heating tank in a state of being inserted into the heating tank, the heater extending in a planar direction between the inlet and the heat exchange outlet and heating the refrigerant in the heating tank during operation.

The heat exchange outlet of the heating tank may be connected to a point upstream of an indoor condenser.

The heater may include a first heating plate extending between the inlet and the heat exchange outlet so that the inlet is located at one side thereof and the heat exchange outlet is located at the other side thereof to block flow of a refrigerant, the first heating plate being opened to permit the flow of the refrigerant at an end portion thereof spaced apart from both the inlet and the heat exchange outlet.

The heater may further include a second heating plate integrally coupled to the first heating plate to heat the refrigerant and configured to extend in a direction crossing a direction in which the first heating plate extends.

The heater may be formed of an upper chamber including the inlet and the heat exchange outlet formed therein, and a lower chamber separated by a guide panel to block flow of the refrigerant, the lower chamber including a heat exchange inlet and an outlet formed therein. The refrigerant-heating device may further include a heat exchanger integrally coupled to the heating tank, configured to allow the refrigerant to flow thereinto from the heat exchange outlet and to discharge the refrigerant through the heat exchange inlet, and disposed so that the refrigerant therein exchanges heat with air therearound.

The guide panel may be bent downwards and extend from a side of the heat exchange outlet to a side of the inlet to expand the upper chamber.

The heat exchanger may be formed of a plurality of outlet tubes extending laterally from the heat exchange outlet, a plurality of inlet tubes extending laterally from the heat exchange inlet, and a connection tank spaced apart from the heating tank and connected to the plurality of outlet tubes and the plurality of inlet tubes.

In accordance with another aspect of the present disclosure, there is provided a heat pump system including the refrigerant-heating device according to the present disclosure, the heat pump system including a compressor provided at a point upstream of the refrigerant-heating device, an indoor condenser provided at a point downstream of the refrigerant-heating device, an external condenser provided at a point downstream of the indoor condenser, an evaporator provided at a point downstream of the external condenser and upstream of the compressor, and a refrigerant circulation flow path configured to allow the refrigerant therein to circulate while sequentially passing through the compressor, the refrigerant-heating device, the indoor condenser, the external condenser, and the evaporator.

The heat pump system may further include a refrigerant branch flow path configured to branch from the refrigerant circulation flow path at a point upstream of the external condenser or a point upstream of the evaporator and to join the refrigerant circulation flow path at a point upstream of the compressor, and a chiller provided in the refrigerant branch flow path and disposed so as to perform heat exchange between the refrigerant therein and a coolant that cools a battery or an electrical component.

In accordance with a further aspect of the present disclosure, there is provided a heat pump system including the refrigerant-heating device according to the present disclosure, the heat pump system including a compressor provided at a point upstream of the refrigerant-heating device, an external condenser provided at a point downstream of the refrigerant-heating device, an evaporator provided at a point downstream of the external condenser and upstream of the compressor, and a refrigerant circulation flow path configured to allow the refrigerant therein to circulate while sequentially passing through the compressor, the refrigerant-heating device, the external condenser, and the evaporator.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Figure 1:
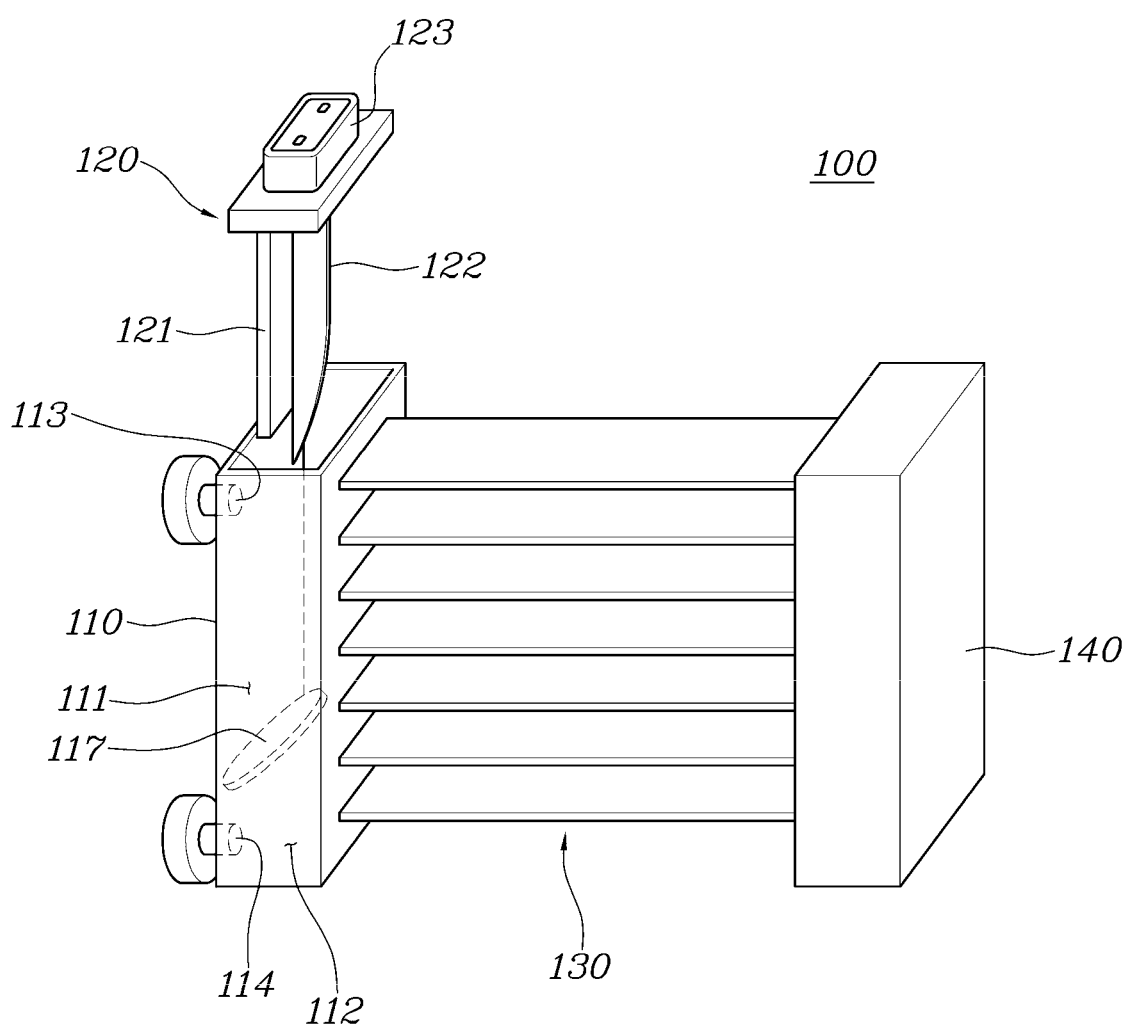
FIG. 1 is an assembly view of a refrigerant-heating device according to an embodiment of the present disclosure.

Specific structural or functional descriptions of the embodiments of the present disclosure disclosed in this specification or application are merely illustrative for the purpose of describing embodiments according to the present disclosure. Further, the present disclosure may be implemented in various forms and should not be construed as being limited to the embodiments described in this specification or application.

Since the embodiments according to the present disclosure may have various modifications and may have various forms, specific embodiments are illustrated in the drawings and described in detail in this specification or application. However, it should be understood that the embodiments according to the concept of the present disclosure are not intended to be limited to the specific disclosed forms, and include all modifications, equivalents, and substitutes included in the spirit and technical scope of the present disclosure.

Meanwhile, in the present disclosure, terms such as first and/or second may be used to describe various components, but the components are not limited by the terms. The terms are used only for the purpose of distinguishing one component from other components. For example, a first component may be referred as a second component, and similarly, a second component may also be referred to as a first component without departing from the scope of rights according to the concept of the present disclosure.

When one component is referred to as being "connected" or "joined" to another component, the one component may be directly connected or joined to the other component, but it should be understood that other components may be present therebetween. On the other hand, when the one component is referred to as being "directly connected to" or "directly in contact with" the other component, it should be understood that other components are not present therebetween. Other expressions describing the relationship between components, such as, "between" and "directly between" or "adjacent to" and "directly adjacent to", should be interpreted in the same manner.

The terms used in the specification are only used to describe specific embodiments, and are not intended to limit the present disclosure. In this specification, an expression in a singular form also includes the plural form, unless otherwise clearly specified in context. It should be understood that expressions such as "comprise" and "have" in this specification are intended to designate the presence of embodied features, numbers, steps, operations, components, parts, or combinations thereof, but do not exclude the presence or addition of one or more other features, numbers, steps, operations, components, parts, or combinations thereof.

Unless otherwise defined, all terms used herein, including technical and scientific terms, have the same meanings as those commonly understood by those skilled in the art to which the present disclosure pertains. Terms such as those defined in commonly used dictionaries should be interpreted as having meanings consistent with their meanings in the context of the related technology. Further, unless explicitly defined in this specification, the above-mentioned terms should not be interpreted in an ideal or overly formal sense.

Hereinafter, the present disclosure will be described in detail by describing preferred embodiments thereof with reference to the accompanying drawings. The same reference numerals in each drawing represent the same members.

Figure 2:
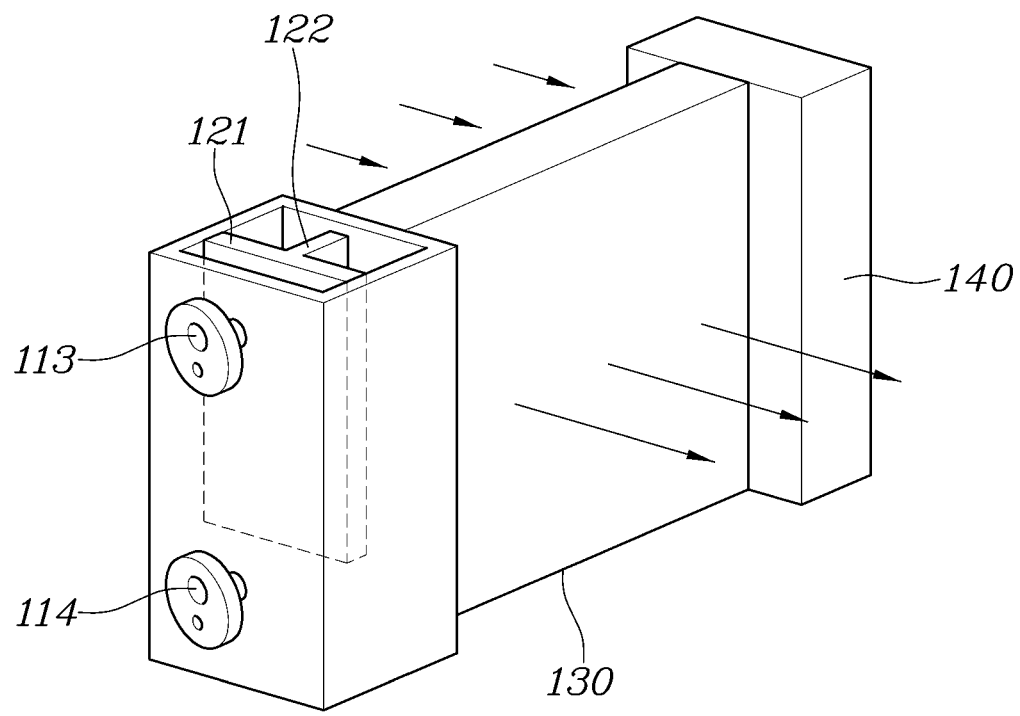
FIG. 2 is a perspective view of the refrigerant-heating device according to the embodiment of the present disclosure.
Figure 3:
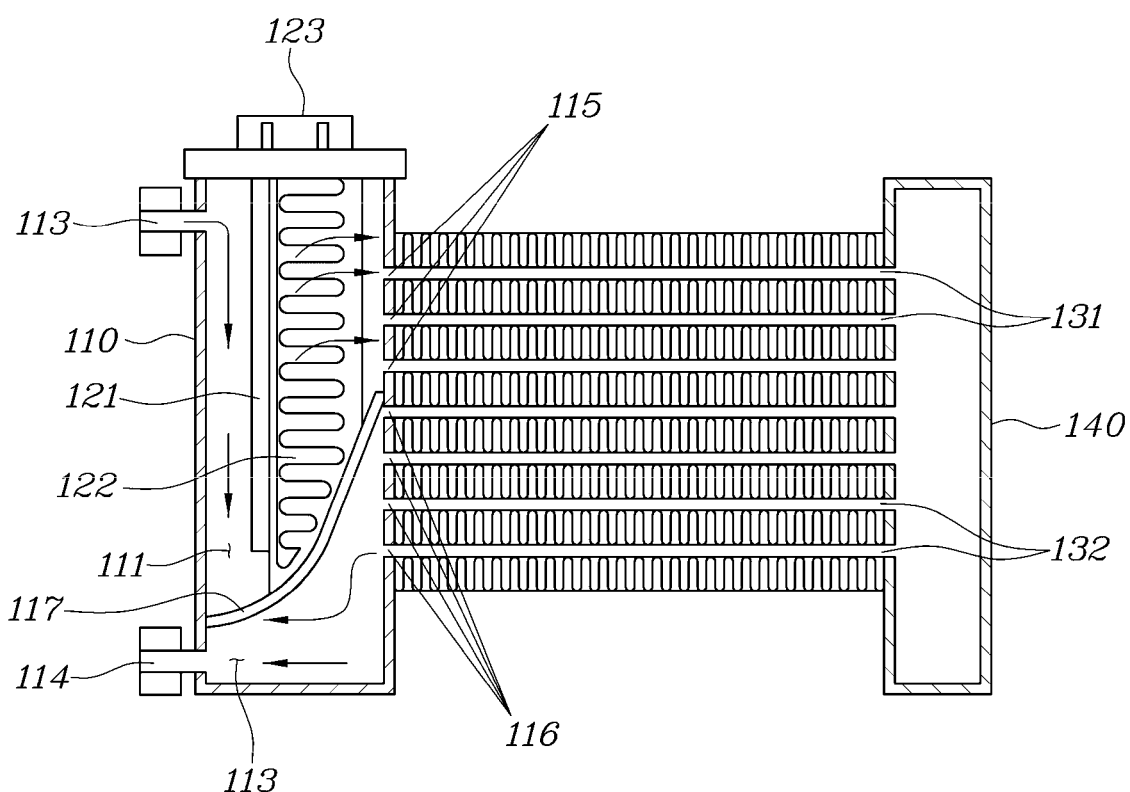
FIG. 3 is a cross-sectional view of the refrigerant-heating device according to the embodiment of the present disclosure.
Figure 4:
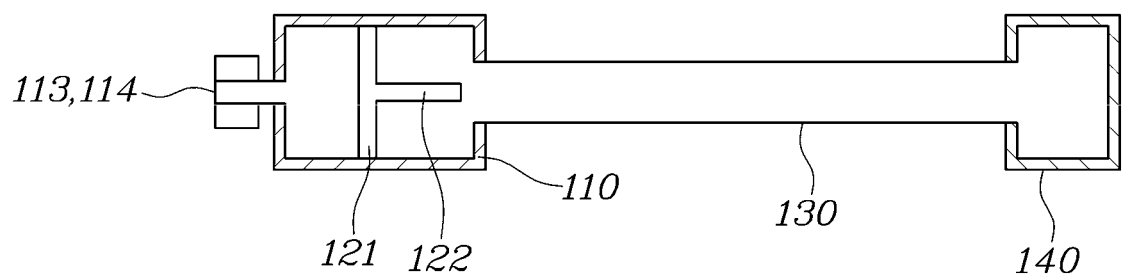
FIG. 4 is a top view of the refrigerant-heating device according to the embodiment of the present disclosure.

FIG. 1 is an assembly view of a refrigerant-heating device 100 according to an embodiment of the present disclosure, FIG. 2 is a perspective view of the refrigerant-heating device 100 according to the embodiment of the present disclosure, FIG. 3 is a cross-sectional view of the refrigerant-heating device 100 according to the embodiment of the present disclosure, and FIG. 4 is a top view of the refrigerant-heating device 100 according to the embodiment of the present disclosure.

Referring to FIGS. 1 to 4, the refrigerant-heating device 100 according to the embodiment of the present disclosure includes a heating tank 110 including an inlet 113, through which a refrigerant discharged from a compressor 200 flows into, and a heat exchange outlet 115, from which the refrigerant is discharged, the heat exchange outlet 115 being located at a position spaced apart from the inlet 113, and a heater 120 coupled to the heating tank 110 in a state of being inserted into the heating tank 110, the heater 120 extending in a planar direction between the inlet 113 and the heat exchange outlet 115 and heating the refrigerant in the heating tank 110 during operation.

The heating tank 110 has a space having the refrigerant flowing therein. Particularly, the heating tank 110 may include the inlet 113 having the refrigerant flowing thereinto and the heat exchange outlet 115 having the refrigerant discharged therefrom. In the embodiment, the inlet 113 into which the refrigerant flows may be formed in one side of the heating tank 110, and the heat exchange outlet 115 from which the refrigerant is discharged may be formed in the other side of the heating tank 110.

The heater 120 may be manufactured as a separate product from the heating tank 110, and may be inserted into the heating tank 110 and fixed thereto. In the embodiment, the heater 120 may be inserted into the heating tank 110 from above or from below the heating tank 110, and when coupled to the heating tank 110, the heater 120 may cover an open upper portion of the heating tank 110 or an open lower portion.

The heater 120 may include a power terminal, which is configured to receive power from the outside and is exposed to the outside of the heating tank 110, and a heating element, which generates heat using the power supplied through the power terminal to heat the refrigerant. The heating element may be provided along an entirety of the heater 120.

Figure 5:
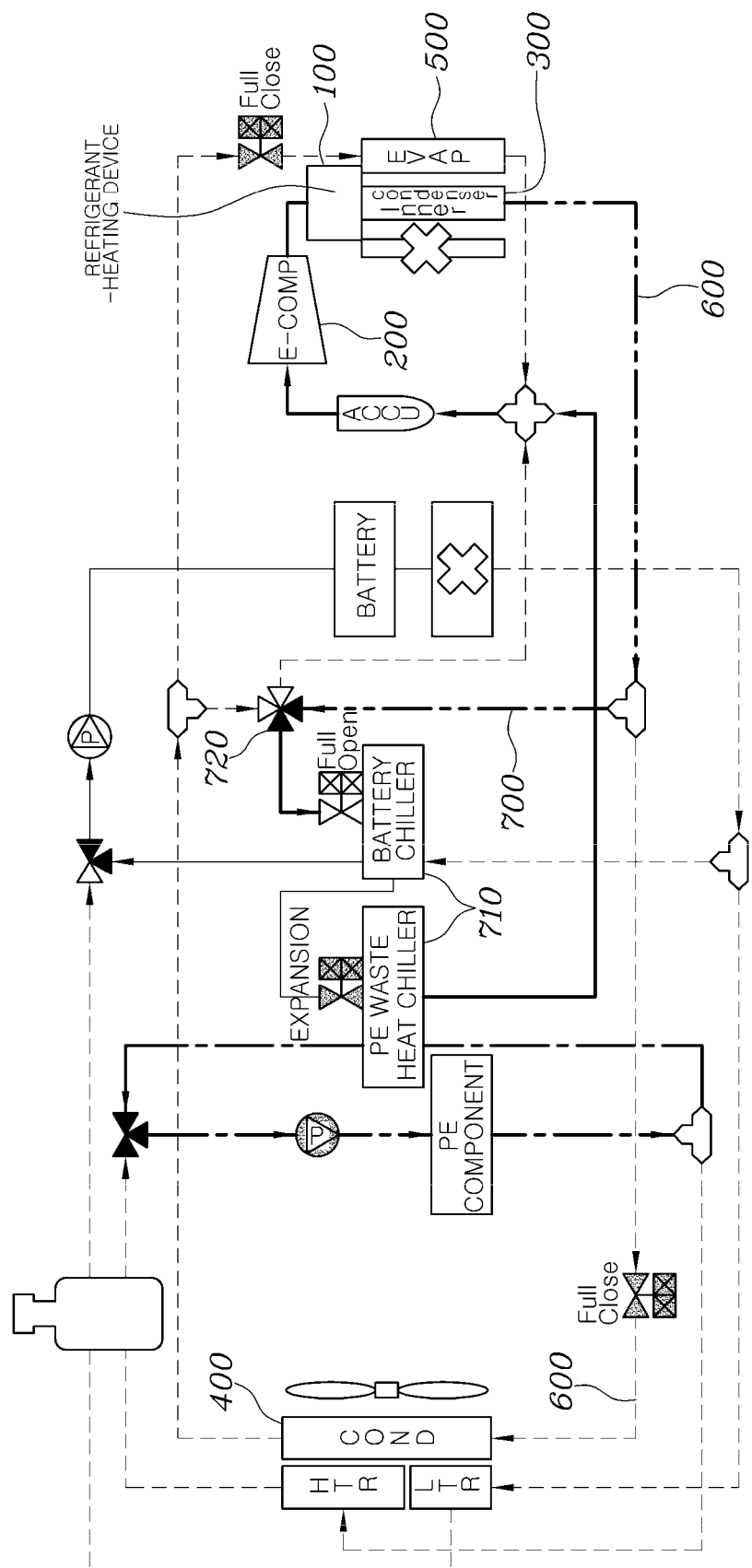
FIG. 5 is a circuit diagram of a heat pump system including the refrigerant-heating device according to the embodiment of the present disclosure.

Particularly, as shown in FIG. 5, the inlet 113 of the heating tank 110 is connected to a point downstream of the compressor 200, and a refrigerant compressed at high temperature and high pressure in the compressor 200 may flow into the inlet 113 of the heating tank 110. The heater 120 may additionally heat the refrigerant compressed in the compressor 200 and introduced into the heating tank 110.

Further, the heat exchange outlet 115 of the heating tank 110 may be connected to a point upstream of the indoor condenser 300. That is, in the embodiment, the inlet 113 of the heating tank 110 is connected to a point downstream of the compressor 200, and the heat exchange outlet 115 of the heating tank 110 is connected to a point upstream of the indoor condenser 300, thereby additionally heating the refrigerant discharged from the compressor 200 and supplying the same to the indoor condenser 300. Accordingly, the amount of heat supplied to the interior of the vehicle increases, and as such, a PTC heater for indoor heating can be eliminated.

More specifically, referring again to FIGS. 1-4, the heater 120 may include a first heating plate 121 extending between the inlet 113 and the heat exchange outlet 115 so that the inlet 113 is located at one side of the first heating plate 121 and the heat exchange outlet 115 is located at the other side to block the flow of refrigerant, the first heating plate 121 being opened to permit the flow of refrigerant at an end portion thereof spaced apart from the inlet 113 and the heat exchange outlet 115.

The first heating plate 121 may extend in a planar direction between the inlet 113 and the heat exchange outlet 115, thereby preventing the refrigerant introduced from the inlet 113 from directly flowing to the heat exchange outlet 115. That is, the refrigerant introduced from the inlet 113 may be guided along one surface of the first heating plate 121 and the other surface thereof while the flow of the refrigerant is blocked by the first heating plate 121, and may flow through the open end portion of the first heating plate 121, which is spaced apart from both the inlet 113 and the heat exchange outlet 115.

In the embodiment, the inlet 113 and the heat exchange outlet 115 are located on one side of the heating tank 110 and the other side thereof at an upper end of the heating tank 110, respectively, and the first heating plate 121 may extend in the vertical direction, that is, in the direction of gravity between one side of the heating tank 110 and the other side thereof. In addition, the first heating plate 121 is formed to permit the flow of the refrigerant at the lower end portion thereof. In detail, the refrigerant introduced from the inlet 113 may flow downwards along the first heating plate 121, may flow upwards again along the first heating plate 121 through the open lower end portion of the first heating plate 121, and may be discharged to the heat exchange outlet 115.

Accordingly, it is possible not only to increase the time during which the refrigerant contacts the heater 120 in the heating tank 110, but also to lengthen the path along which the refrigerant contacts the heater 120 therein.

In addition, the heater 120 may be integrally coupled to the first heating plate 121 to heat the refrigerant, and may further include a second heating plate 122 extending in a direction crossing a direction in which the first heating plate 121 extends.

The second heating plate 122 may extend in a direction perpendicular to or inclined relative to the plane of the first heating plate 121, and may include a heating element as in the case of the first heating plate 121.

In the embodiment, the second heating plate 122 may extend toward the heat exchange outlet 115 in a direction perpendicular to a planar direction in which the first heating plate 121 extends, may further extend up to the opened lower end portion of the first heating plate 121, and may extend along a bent shape of a guide panel 117 to be described later. In another embodiment, the second heating plate 122 may extend toward the inlet 113.

Particularly, the refrigerant-heating device 100 according to the embodiment of the present disclosure may be formed to be integrated with the indoor condenser 300. That is, in another embodiment to be described later, a heat exchanger 130 of the refrigerant-heating device 100 may be located in an indoor air-conditioning line to heat the air flowing into the passenger compartment.

Specifically, the heating tank 110 is formed of an upper chamber 111 including the inlet 113 and the heat exchange outlet 115 formed therein, and a lower chamber 112 separated by the guide panel 117 to block the flow of the refrigerant, the lower chamber 112 including a heat exchange inlet 116 and an outlet 114 formed therein. The refrigerant-heating device 100 may further include a heat exchanger 130, which is integrally coupled to the heating tank 110, is configured to allow the refrigerant to flow thereinto from the heat exchange outlet 115 and to discharge the refrigerant through the heat exchange inlet 116, and is disposed so that the refrigerant therein exchanges heat with the surrounding air.

That is, the heating tank 110 includes the guide panel 117 configured to divide the inside of the heating tank 110 into the upper chamber 111 and the lower chamber 112. Further, the upper chamber 111 may be formed above the guide panel 117, and the lower chamber 112 may be formed below the guide panel 117.

Particularly, the inlet 113 into which the refrigerant flows may be formed in the upper chamber 111, and the outlet 114 from which the refrigerant is discharged may be formed in the lower chamber 112. Accordingly, the refrigerant heated in the upper chamber 111 may be cooled while passing through the heat exchanger 130, and the cooled refrigerant may be separated and discharged through the lower chamber 112.

In addition, the heat exchange outlet 115 may be formed in the upper chamber 111, and the heat exchange inlet 116 may be formed in the lower chamber 112. That is, the refrigerant heated in the upper chamber 111 is discharged to the heat exchanger 130 through the heat exchange outlet 115, and the refrigerant having exchanged heat in the heat exchanger 130 may flow back into the lower chamber 112 through the heat exchange inlet 116.

The heater 120 is located in the upper chamber 111 of the heating tank 110, and may extend up to the guide panel 117 in a state of being inserted into the upper chamber 111. Particularly, the heater 120 may extend along the extended shape of the bent guide panel 117, as will be described later.

The guide panel 117 may be bent downwards as the same extends from the side of the heat exchange outlet 115 to the side of the inlet 113, thereby expanding the upper chamber 111.

The guide panel 117 divides the heating tank 110 into the upper chamber 111 and the lower chamber 112, and particularly, may extend while being bent downwards to expand the inside of the upper chamber 111.

Specifically, the heating tank 110 includes a plurality of heat exchange outlets 115 and a plurality of heat exchange inlets 116 connected to a plurality of tubes of the heat exchanger 130. Further, for balanced flow therebetween, the heat exchange outlets 115 and heat exchange inlets 116 may be provided in the same number or may be formed so as to have the same opening area. Accordingly, the guide panel 117 may be located at a central portion of the heating tank 110 on the side where the heat exchange outlet 115 and the heat exchange inlet 116 are formed in the heating tank 110.

However, in order to supply a sufficient amount of heat using the refrigerant in the heating tank 110 including the heater 120, the inner space of the upper chamber 111 may be increased so that the flow time of the refrigerant and the flow path thereof in the upper chamber 111 are increased. Accordingly, the guide panel 117 may be bent downwards while extending from the side of the heat exchange outlet 115 and the heat exchange inlet 116 to the side of the inlet 113, thereby expanding the upper chamber 111. Particularly, the guide panel 117 may be bent obliquely.

In the embodiment, the heat exchanger 130 is formed of a plurality of tubes having the refrigerant flowing thereinto. The plurality of tubes may be spaced apart from each other to exchange heat with the outdoor air, and the surface areas thereof may be expanded.

The heat exchanger 130 may be formed of a plurality of outlet tubes 131 extending laterally from the heat exchange outlet 115, a plurality of inlet tubes 132 extending laterally from the heat exchange inlet 116, and a connection tank 140 spaced apart from the heating tank 110 and connected to the plurality of outlet tubes 131 and the plurality of inlet tubes 132.

Specifically, the heat exchanger 130 is configured to exchange heat with air flowing into the interior of the vehicle. The plurality of outlet tubes 131, which are connected to the heat exchange outlet 115 of the heating tank 110, and the plurality of inlet tubes 132, which are connected to the heat exchange inlet 116 of the heating tank 110, may be disposed so as to exchange heat with the outdoor air. Here, one end of each of the plurality of outlet tubes 131 and the plurality of inlet tubes 132 is formed to extend laterally from one side of the heating tank 110, thereby expanding the surface area with which it is possible to perform heat exchange with the outdoor air.

In addition, the heat exchanger 130 includes the connection tank 140 connected to the other ends of the plurality of outlet tubes 131 and the plurality of inlet tubes 132, thereby making it possible to receive the refrigerant introduced from the plurality of outlet tubes 131 and to discharge the same to the plurality of inlet tubes 132. That is, the connection tank 140 may combine the refrigerant introduced from the plurality of outlet tubes 131, and may separate cooler refrigerant downwards to discharge the same to the plurality of inlet tubes 132.

The refrigerant-heating device 100 according to another embodiment may be formed separately from the indoor condenser 300, and may be disposed at a point upstream of the indoor condenser 300.

FIG. 5 is a circuit diagram of a heat pump system including the refrigerant-heating device 100 according to the embodiment of the present disclosure.

Further referring to FIG. 5, the heat pump system including the refrigerant-heating device 100 according to the embodiment of the present disclosure includes a compressor 200 provided at a point upstream of the refrigerant-heating device 100, an indoor condenser 300 provided at a point downstream of the refrigerant-heating device 100, an external condenser 400 provided at a point downstream of the indoor condenser 300, an evaporator 500 provided between a point downstream of the external condenser 400 and a point upstream of the compressor 200, and a refrigerant circulation flow path 600 configured to allow the refrigerant therein to circulate while sequentially passing through the compressor 200, the refrigerant-heating device 100, the indoor condenser 300, the external condenser 400, and the evaporator 500.

The refrigerant circulation flow path 600 is a path through which the refrigerant circulates while flowing therein. The refrigerant circulation flow path 600 may have the compressor 200, the refrigerant-heating device 100, the indoor condenser 300, the external condenser 400, and the evaporator 500 of the present disclosure sequentially provided along the same.

Particularly, the refrigerant-heating device 100 according to the embodiment of the present disclosure is located at a point upstream of the indoor condenser 300, and may be integrally coupled to the indoor condenser 300.

The compressor 200 compresses the refrigerant of the refrigerant circulation flow path 600 flowing thereinto at high temperature and high pressure. The refrigerant-heating device 100 may additionally heat the refrigerant discharged from the compressor 200 and may allow the same to flow to the indoor condenser 300. Accordingly, the refrigerant primarily compressed in the compressor 200 is additionally heated, thereby having an effect of increasing the amount of heat transfer in the indoor condenser 300.

The refrigerant discharged from the indoor condenser 300 through the refrigerant-heating device 100 may sequentially pass through the external condenser 400 and the evaporator 500. An expansion valve is provided at each of the points upstream of the external condenser 400 and the evaporator 500, thereby permitting the flow of, expanding, or blocking the refrigerant flowing thereinto. The refrigerant expanded by the expansion valve may absorb heat in the external condenser 400 or the evaporator 500.

The heat pump system may further include a refrigerant branch flow path 700 configured to branch from the refrigerant circulation flow path 600 at a point upstream of the external condenser 400 or at a point upstream of the evaporator 500, and to join the refrigerant circulation flow path 600 at a point upstream of the compressor 200, and a chiller 710 provided in the refrigerant branch flow path 700 and disposed so as to perform heat exchange between the refrigerant therein and a coolant that cools a battery or an electrical component.

The refrigerant branch flow path 700 may branch at a point upstream of the external condenser 400 or at a point upstream of the evaporator 500 to bypass the external condenser 400 or the evaporator 500. Particularly, the refrigerant branch flow path 700 may branch from the refrigerant circulation flow path 600 at a point upstream of the external condenser 400 and a point upstream of the evaporator 500, and the refrigerant in the refrigerant circulation flow path 600 may selectively flow thereinto through an integrated valve 720.

In addition, the refrigerant flowing into the refrigerant branch flow path 700 may flow to the chiller 710 through the integrated valve 720, or may bypass the chiller 710 to join the refrigerant circulation flow path 600 at the point upstream of the compressor 200. In the embodiment, the integrated valve 720 is connected to the refrigerant circulation flow path 600 to selectively receive the refrigerant from the refrigerant circulation flow path 600 at the point upstream of the external condenser 400 and the point upstream of the evaporator 500. Further, the integrated valve 720 may be a 4-way valve formed to selectively discharge the refrigerant to the refrigerant circulation flow path 600 at the point upstream of the compressor 200 and to the refrigerant branch flow path 700 at a point upstream of the chiller 710.

The chiller 710 is disposed so that the refrigerant therein exchanges heat with the coolant that cools the battery or the electrical component. An expansion valve is provided at a point upstream of the chiller 710 to selectively permit the flow of, expand, or block the refrigerant.

In the embodiment, the chiller 710 may separately include devices, each of which is capable of exchanging heat with a corresponding one of a coolant in a battery-cooling circuit that cools a battery and a coolant in an electrical-component-cooling circuit that cools electrical components.

In another embodiment, the chiller 710 may be provided as an integrated device so as to simultaneously exchange heat with the coolant in the battery-cooling circuit that cools the battery and the coolant in the electrical-component-cooling circuit that cools electrical components.

Accordingly, the refrigerant heated in the refrigerant-heating device 100 heats the coolant in the battery-cooling circuit using the chiller 710, thereby having an effect of obviating the heater 120 that raises the temperature of the battery. Particularly, according to the refrigerant flow shown in the drawing, the coolant in the battery-cooling circuit in the chiller 710 may absorb heat from the refrigerant, thereby raising the temperature of the battery.

In addition, the chiller 710 may absorb waste heat from the battery or waste heat from electrical components, thereby increasing the amount of heat transfer in the indoor condenser 300.

Additionally, the heat pump system including the refrigerant-heating device 100 according to the embodiment of the present disclosure includes the compressor 200 provided at a point upstream of the refrigerant-heating device 100, the external condenser 400 provided at a point downstream of the refrigerant-heating device 100, the evaporator 500 provided at a point downstream of the external condenser 400 and upstream of the compressor 200, and the refrigerant circulation flow path 600 configured to allow the refrigerant therein to circulate while sequentially passing through the compressor 200, the refrigerant-heating device 100, the external condenser 400, and the evaporator 500. Here, the heat exchanger 130 of the refrigerant-heating device 100 may be disposed so as to exchange heat with outdoor air.

That is, as shown in the drawing, the refrigerant-heating device 100 of the present disclosure is formed to be integrated with the indoor condenser 300, and may be disposed inside the indoor air-conditioning line so that the heat exchanger 130 of the refrigerant-heating device 100 serves as the indoor condenser 300.

As is apparent from the above description, according to a refrigerant-heating device and a heat pump system including the same of the present disclosure, when a vehicle is started, the refrigerant-heating device additionally heats a refrigerant discharged from a compressor, thereby increasing the amount of heat transfer in an indoor condenser and having an effect of obviating a PCT heater.

Further, since the refrigerant-heating device heats the refrigerant when the vehicle is started, a battery-cooling circuit absorbs heat from an integrated chiller to raise the temperature of a battery, and, as such, the coolant heater can be eliminated.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A refrigerant-heating device comprising:
   a heating tank comprising:
   an inlet, through which a refrigerant discharged from a compressor flows into; and
   a heat exchange outlet, from which the refrigerant is discharged, the heat exchange outlet being located at a position spaced apart from the inlet; and
   a heater being inserted into the heating tank, the heater extending in a planar direction between the inlet and the heat exchange outlet, and configured to heat the refrigerant in the heating tank during operation;
   wherein the heater is formed of an upper chamber comprising the inlet and the heat exchange outlet, and a lower chamber separated by a guide panel to block flow of the refrigerant, the lower chamber comprising a heat exchange inlet and an outlet; and
   wherein the refrigerant heating device further comprises a heat exchanger integrally coupled to the heating tank, the heat exchanger being configured to allow the refrigerant to flow into the heat exchanger from the heat exchange outlet and to discharge the refrigerant through the heat exchange inlet, and positioned so that the refrigerant exchanges heat with air.

2. The refrigerant-heating device according to claim 1, wherein the heat exchange outlet of the heating tank is connected to a point upstream of an indoor condenser.

3. The refrigerant-heating device according to claim 1, wherein the heater comprises a first heating plate extending between the inlet and the heat exchange outlet so the inlet is located at one side of the first heating plate and the heat exchange outlet is located at an other side of the first heating plate to block flow of the refrigerant, the first heating plate being opened to permit the flow of the refrigerant at an end portion of the first heating plate, the end portion being spaced apart from both the inlet and the heat exchange outlet.

4. The refrigerant-heating device according to claim 3, wherein the heater further comprises a second heating plate integrally coupled to the first heating plate, the second heating plate being configured to heat the refrigerant and being positioned to intersect the first heating plate.

5. The refrigerant-heating device according to claim 1, wherein the guide panel is bent downwards and extends from a side of the heat exchange outlet to a side of the inlet to expand the upper chamber.

6. The refrigerant-heating device according to claim 1, wherein the heat exchanger is formed of a plurality of outlet tubes extending laterally from the heat exchange outlet, a plurality of inlet tubes extending laterally from the heat exchange inlet, and a connection tank spaced apart from the heating tank and connected to the plurality of outlet tubes and the plurality of inlet tubes.

7. A heat pump system comprising the refrigerant-heating device according to claim 1, the heat pump system comprising:
- the compressor provided upstream of the refrigerant-heating device;
- an indoor condenser provided downstream of the refrigerant-heating device;
- an external condenser provided downstream of the indoor condenser;
- an evaporator provided downstream of the external condenser and upstream of the compressor; and
- a refrigerant circulation flow path configured to allow the refrigerant to circulate while sequentially passing through the compressor, the refrigerant-heating device, the indoor condenser, the external condenser, and the evaporator.

8. The heat pump system according to claim 7, further comprising:
- a refrigerant branch flow path configured to branch from the refrigerant circulation flow path upstream of the external condenser or upstream of the evaporator and to join the refrigerant circulation flow path upstream of the compressor; and
- a chiller provided in the refrigerant branch flow path and disposed to perform heat exchange between the refrigerant and a coolant that cools a battery or an electrical component.

9. A heat pump system comprising the refrigerant-heating device according to claim 1, the heat pump system comprising:
- the compressor provided upstream of the refrigerant-heating device;
- an external condenser provided downstream of the refrigerant-heating device;
- an evaporator provided downstream of the external condenser and upstream of the compressor; and
- a refrigerant circulation flow path configured to allow the refrigerant to circulate while sequentially passing through the compressor, the refrigerant-heating device, the external condenser, and the evaporator;
- wherein the heat exchanger of the refrigerant-heating device is disposed to exchange heat with outdoor air.

* * * * *